INVENTORS.
JOSHUA LADELL
IMRE E. VAJDA
BY
Frank R. Trifari
AGENT

INVENTORS.
JOSHUA LADELL
IMRE E. VAJDA $R = 2 \sin\left(\frac{\gamma \max}{2}\right)$

INVENTORS
JOSHUA LADELL
IMRE E. VAJDA
BY
AGENT

United States Patent Office 3,333,099
Patented July 25, 1967

3,333,099
SINGLE CRYSTAL X-RAY DIFFRACTOMETER WITH A TOTAL-CIRCLE-OF-REFLECTION SENSOR
Joshua Ladell, Monsey, and Imre E. Vajda, Yonkers, N.Y., assignors to North American Philips Company, Inc., New York, N.Y., a corporation of Delaware
Filed July 6, 1964, Ser. No. 380,257
2 Claims. (Cl. 250—51.5)

Our invention relates to an automatic single crystal diffractometer, i.e., a device for automatically recording, systematizing and indexing diffraction effects from a crystal specimen irradiated by X-rays and other penetrating radiation.

An automatic single crystal diffractometer based upon a point drive mechanism has been described by Ladell and Lowitzsch, Acta Cryst. 13, 205–215 (1960), and in U.S. Patent 3,105,901. As pointed out in the description of the principle of such devices in the above publications, the range accessible for a given zone or level to be scanned in a reciprocal space section is limited by the maximum angle $T_{max}$ to which the detector may be brought, i.e., $$\sqrt{x_0^2 + y_0^2} < 2 \sin \frac{T_{max}}{2} \quad (I)$$

where $x_0$ is the displacement of the point drive nut from the center of the "$x$" lead-screw, and $y_0$ the displacement of the "$x$" lead-screw from the axis of rotation of the crystal.

In order to automate the acquisition of data for a zone or level of reflections, it is required that the point drive nut be incremented in discrete steps $\Delta x$ along a given reciprocal lattice line and also be incremented in discrete steps $\Delta y$ to move the point drive nut to an adjacent line after the scan along a given line has been completed. For reciprocal nets which are not orthogonal, a further requirement is that following a $\Delta y$ displacement the point drive nut be offset initially along the "$x$" lead-screw a discrete step $\Delta r$ or $\Delta x - \Delta r$ depending upon the sense of displacement along the "$x$" lead-screw.

The automation program for scanning the reflections of a zone or level is as follows. Upon rapidly reaching the position $(x_i, y_i)$ corresponding to a reciprocal lattice point, the crystal is independently oscillated through a fixed angular range as the integrated intensity is measured. The independent integrated intensity scan sequence includes the indexing, measurement and publication of both the background count and accumulated integrated intensity and restoration of the crystal to its initial attitude with respect to the linkage.

To implement the program of shifting from a given line to an adjacent line when registration of intensity data for all the reflections of the given line has been completed, it is necessary to have some means of recognizing when the acquisition of data attainable in the given line has been exhausted. This requires a device which can recognize when the last obtainable reciprocal lattice point (or reflection site) lying on a given line colinear with the "$x$" lead-screw has been attained in order to halt the movement of the nut on the lead-screw and then effect a displacement of the "$x$" lead-screw and then permit a similar scan on an adjacent parallel reciprocal lattice line.

It is a principal object of our invention to provide such a device so as to fully automate the exploring of reflection sites within a given zone or level of a crystal.

A further object of our invention is to provide for reaching virtually all the reciprocal lattice points within the instrument total circle of reflection for a given reciprocal space section in a continuous automatic sequence.

A still further object of our invention is to attain the aforesaid objects employing only a single unidirectional counter for controlling the incrementation of the point drive nut in the instrument x-y plane (plane parallel to the lead-screws).

These and further objects of our invention will appear as the specification progresses.

In accordance with the invention, we provide an early-warning total-circle-of-reflection sensor which provides means for conveniently recognizing the last obtainable reciprocal lattice point lying on a line collinear with "$x$" lead-screw. In a particular embodiment of our invention, we employ an electromechanical analogue of the total circle of reflection which provides that an electrical condition on a relay is altered whenever a cam supported on the point drive nut approaches the boundary of the total circle of reflection.

The invention will be explained and more clearly understood with reference to the accompanying drawing in which.

Figure 1:
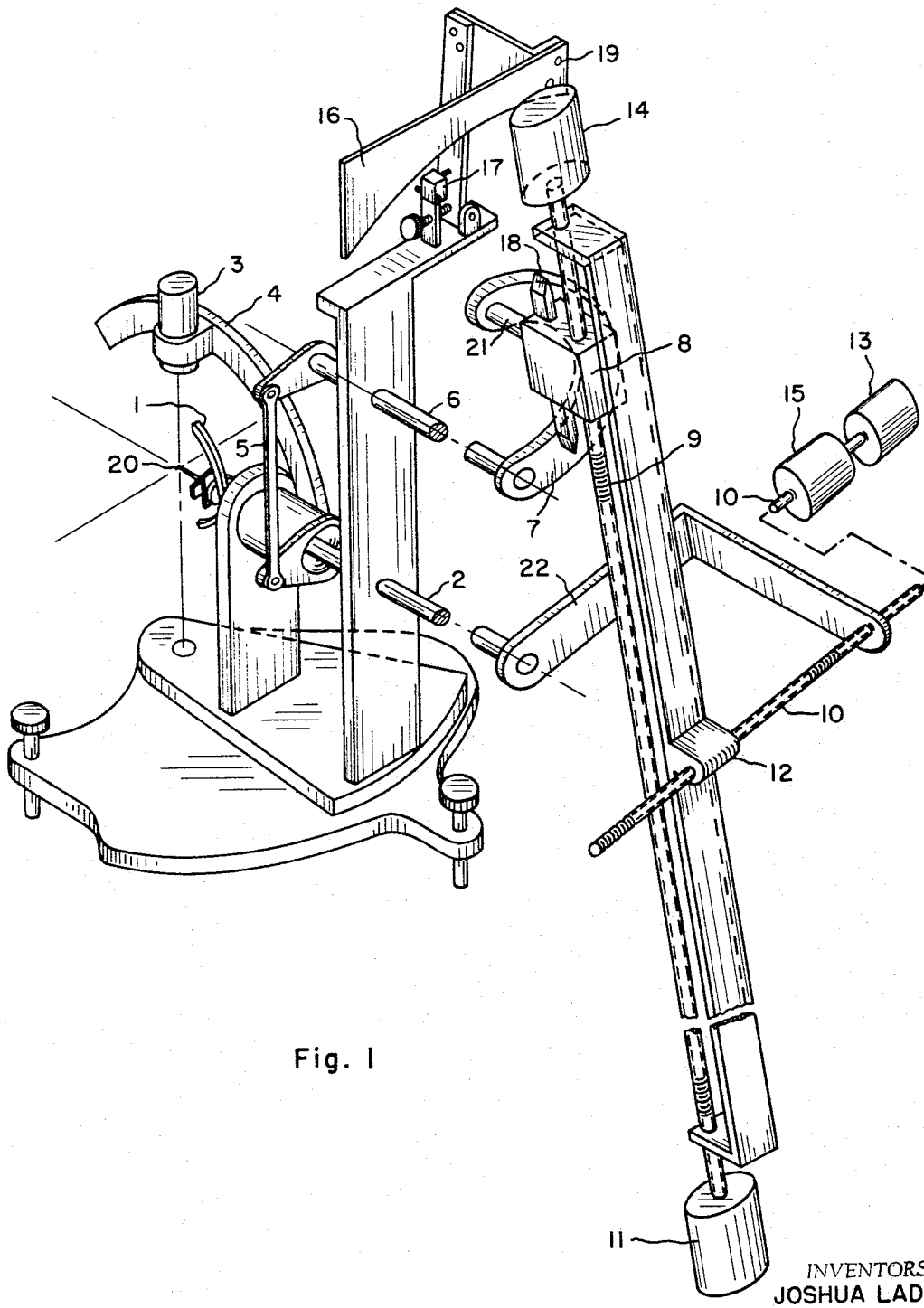
FIG. 1 shows an X-ray diffractometer for automatically acquiring reflection data from a single crystal, in which our invention is employed.

Referring to FIG. 1 of the drawing, a single crystal 20 is mounted on an Eulerian cradle 1 which is rotatable about an axis coincident with the axis of shaft 2 and is exposed to collimated beam of X-rays. X-rays reflected by the crystal are diffracted and detected by detector 3, slideably mounted on arc 4. The movement of the detector about the axis of shaft 2 is coordinated with that of the crystal by means of a linkage 5 which transfers rotation of shaft 6 effected by link 7, the terminus of which is constrained to rotate about a shaft 21 which is rigidly connected to point drive nut 8.

Link 7 is rotated by the displacement of the point drive nut 8 which is linearly displaced either by rotation of lead-screw 9 driven by motor 11, or by rotation of lead-screw 10 driven by motor 13. When the point drive nut 8 is at the center of the lead-screw 9 and the "$x$" lead-screw carriage 12 positioned on lead-screw 10 such that the axis of shaft 21 coincides with the axis of shaft 2, the origin of a coordinate system is defined to measure the displacement of the point drive nut. Designating displacement of the point drive nut parallel to the "$x$" lead-screw 9 toward motor 11 as $x_0$ and the displacement of the "$x$" lead-screw carriage 12 from motor 13 as $y_0$, link 7 is constrained to move such that the angle $T$ between a line in a plane perpendicular to the axis of shaft 2 passing through the axis of shaft 6 and shaft 21 and the line in the same plane passing through the axes of shafts 2 and 6 is determined by:

$$2 \sin \frac{T}{2} = \sqrt{x_0^2 + y_0^2}$$

When the point drive nut 8 is in the position $(x_0, y_0)$ the angle $\omega$ measured between the line passing through the axes of shafts 2 and 6 in a plane perpendicular to the axis of shaft 2 and a line parallel to the "$x$" lead-screw 9 is constrained such that:

$$\omega = \frac{T}{2} + \tan^{-1} \frac{y_0}{x_0}$$

Because yoke 22 is rigidly connected to shaft 2, the crystal 20 is displaced through the angle $\omega$ and the detector through the angle $T$ when the point drive nut is displaced $x_0, y_0$ in correspondence with the required tracking equation (see references above):

$$T = \omega + \cos^{-1} (\cos \omega + y_0)$$

In order to automate the acquisition of data for a zone or level of reflections, the point drive nut 8 must be moved in discrete steps along a given reciprocal lattice line, and also be moved in discrete steps $\Delta y$ to move the point drive nut 8 to an adjacent line after the scan along the given line has been completed. For reciprocal nets which are not orthogonal, a further requirement is that following a $\Delta y$ displacement, the point drive nut 8 be offset initially along the "$x$" lead-screw a discrete step $\Delta r$ or $\Delta x - \Delta r$ depending upon the sense of displacement along the "$x$" lead-screw. Thus, after a given reciprocal lattice line has been scanned, when the point drive nut 8 has traversed the "$x$" slide 9 and has reached the position shown, the "$x$" slide is moved along the "$y$" slide 10 to which it is coupled by a similar nut 12 on the "$y$" lead-screw driven by motor 13. These requirements are indicated schematically in FIG. 2.

The automation program for scanning the reflections of a zone or level is as follows: Upon reaching the position ($x_1$, $y_1$) corresponding to a reciprocal lattice point, the crystal is independently oscillated through a fixed angular range as the integrated intensity of the reflected X-rays is detected by detector 3 and measured. The independent integrated intensity sequence includes the indexing, measurement and publication of both the background count and accumulated integrated intensity and restoration of the crystal to its initial attitude with respect to the linkage.

Figure 2:
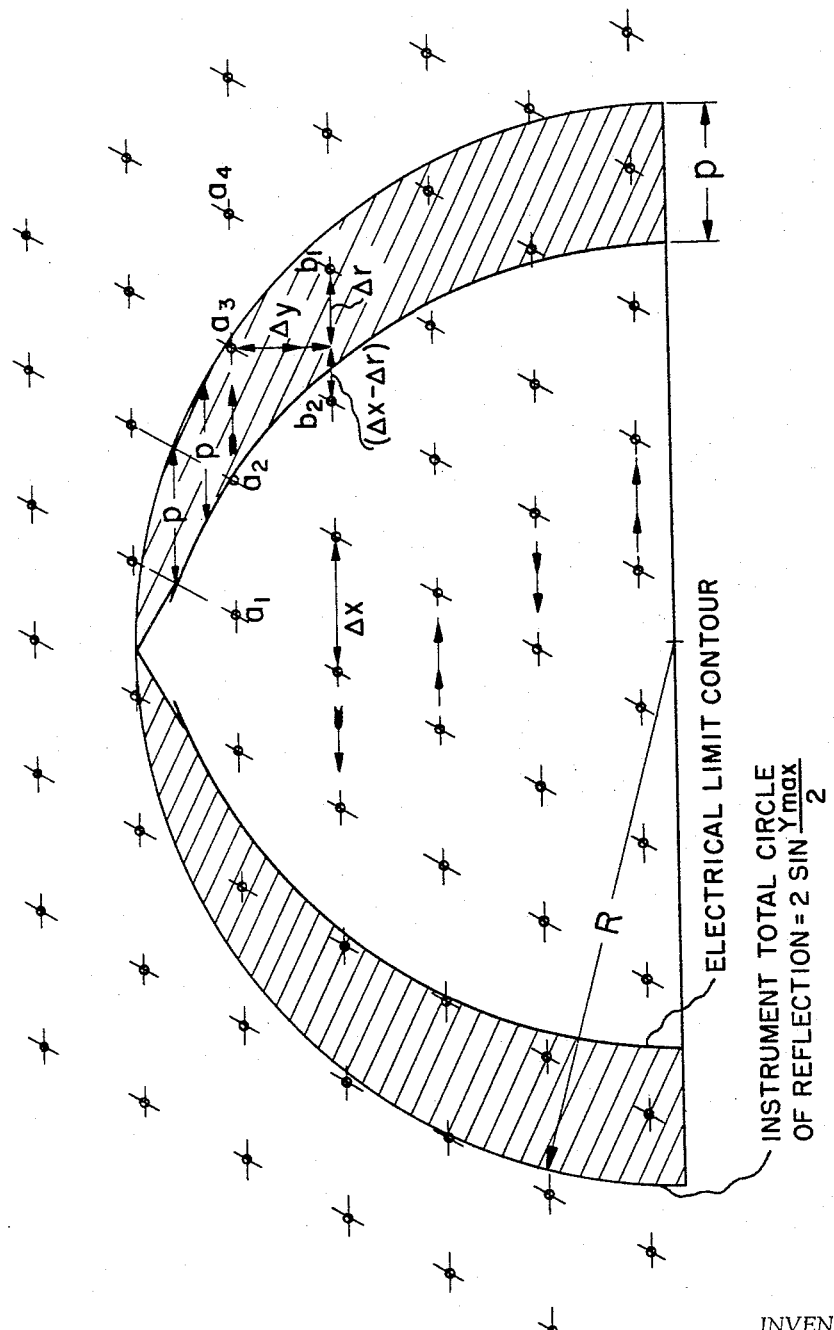
FIG. 2 is a diagram of a reciprocal lattice level of a single crystal showing the instrumental circle of reflection.

Consider the reciprocal lattice point $\alpha$ (FIG. 2). When the point drive nut 8 is displaced $\Delta x$, the linkage complex supported on yoke 22 bring detector 3 and the crystal 20 to angular positions $\Upsilon$, $\omega$ appropriate for the execution of an integrated intensity scan of the diffraction spectra corresponding to the reciprocal lattice point $\alpha_2$. After acquiring and publishing the data for point $\alpha_2$, a further displacement, $\Delta x$, will bring the linkage to the next reciprocal lattice point $\alpha_3$. After executing the integrated intensity scan for point $\alpha_3$, further displacement $\Delta x$ to reach point $\alpha_4$ would tend to drive the detector 3 to an angle greater than $\Upsilon_{max}$ in violation of the inequality, I. Thus, some means must be provided to signal that the point $\alpha_3$ is the ultimate point attainable on line $\alpha_1-\alpha_4$. To move $\Delta x$, "$x$" lead-screw 9, and $\Delta y$ "$y$" lead-screw 10, are caused to rotate by activating clutch brakes (not shown) transmitting motion from the continuously running motors 11 and 13 to the lead-screws. Photo-pulse generator 14, which is rotated synchronously with the "$x$" lead-screw, emits a fixed number of electrical pulses per shaft revolution. The electrical pulses are counted by a preset electronic counter (not shown) which halts the shaft when the equivalent of $\Delta x$ pulses are counted. Accordingly, $\Delta x$, the increment of displacement of point drive nut 8, is measured by the number of pulses emitted. Similarly, photo-pulse generator 15, which is rotated synchronously with "$y$" lead-screw 10, emits a fixed number of electrical pulses per shaft revolution which are counted by a preset electronic counter (not shown) which halts the motion of the "$y$" lead-screw when the equivalent of $\Delta y$ pulses have been counted. Thus, $\Delta y$, the increment of displacement of the "$y$" point drive nut 12 is measured in a similar manner as that of the $x$-drive.

After establishing the diffraction intensity information represented by point $\alpha_3$, it is therefore necessary to position the linkage to measure the diffraction spectra represented by point $b_1$ the initial point on the adjacent line $b_1-b_2$ and subsequently to continue to move to the left until all the reciprocal lattice points on the line $b_1-b_2$ within the instrumental total circle of reflection are surveyed, and after this to continue in alternate directions along adjacent lines to exhaust all the points within the instrumental total circle of reflection.

This is accomplished in accordance with the invention by measuring a fixed amount $p$ in excess of $\Delta x$ horizontally towards the interior of instrumental total circle of reflection and forming the envelope of the extremities of the segments. This envelope, constituting a limit contour, is sensed mechanically and an electrical condition on a relay is altered whenever the point drive nut is in the shaded region of FIG. 2. If the presence of the point drive nut within the shaded region is designated as condition F (flag) and the presence of the point drive nut in the unshaded area as NF (no flag), the invention permits the exhaustion of the reciprocal lattice net according to the program shown in FIG. 3.

The point drive nut is initially at a reciprocal lattice point for which the condition is NF. After the integrated intensity scan sequence is executed for this point, the point drive nut is moved a distance $\Delta x$ along the "$x$" lead-screw to the next reciprocal lattice point. At this point, the condition of the instrument is tested for NF or F. If the condition is NF, an integrated intensity scan for this point is executed and successive displacements and scans repeated until the condition F is indicated. When this condition is indicated, an intensity scan of this point is executed followed by decrementing the $y$ point drive nut a distance $\Delta y$ and then decrementing the $x$ point drive nut a distance $\Delta x - \Delta r$. The instrument is tested again for a flag condition. If the condition indicated is NF, the $x$ point drive nut is displaced a distance $\Delta x$, and the operation repeated until condition F is indicated. An intensity scan is then executed and the $x$ point drive nut decremented a distance $\Delta x$. If the instrument condition is NF, an intensity scan is executed, the $x$ point drive nut decremented $\Delta x$, and the operation repeated until a flag condition, F, is indicated. An intensity scan is executed and the $y$ point drive decremented $\Delta y$ and then incremented $\Delta r$. The instrument is tested for a flag condition until condition F is indicated at which time an intensity scan is executed and the sequence of operations repeated.

This program is executed utilizing a preset electronic counter which, by relay selection, can match the count to four preset numbers, i.e., parameters $\Delta x$, $\Delta y$, $\Delta x - \Delta r$, and $\Delta r$. The selection of the appropriate preset numbers and the reversing of the $x$-meter is governed by the previous as well as the present condition of the total circle of reflection sensor. These conditions control a tripping relay by means of which the program is executed.

Figure 4:
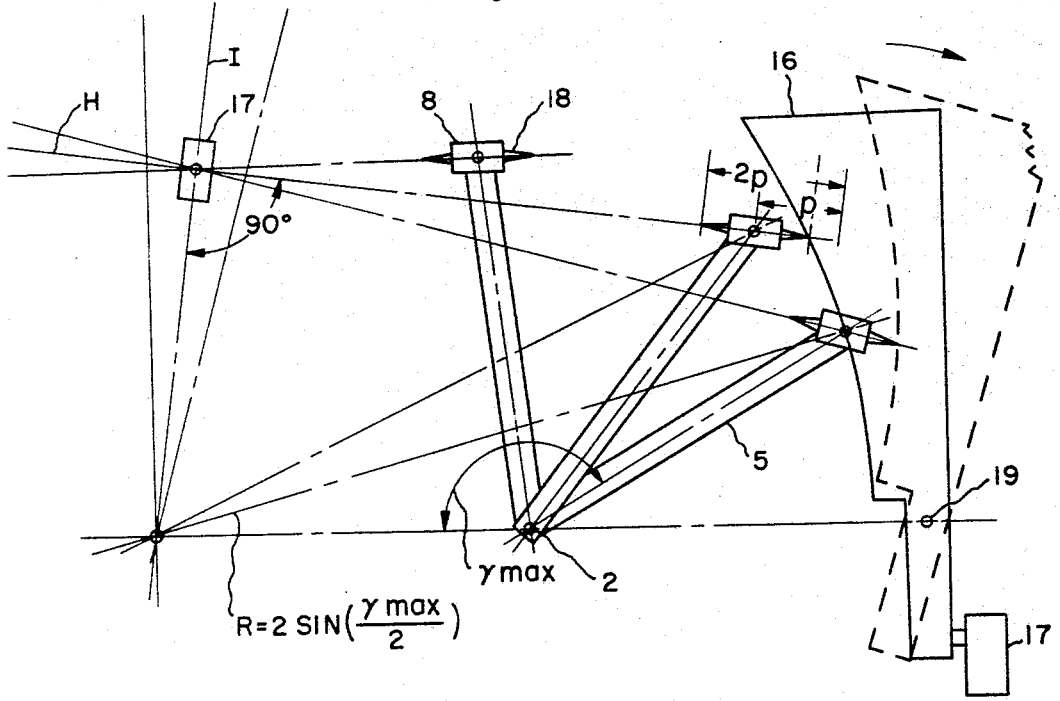
FIG. 4 is a schematic diagram showing the operation of the sensor for detecting the operational limits of the diffractometer.

FIG. 4 shows one particular apparatus for executing this sequence of operations. In this figure, the $x$ and $y$ drives are shown respectively as lines H and I. The point drive nut 8 is on the "$x$" lead-screw (FIG. 1) and the "$x$" lead-screw is retained on the "$y$" lead-screw by means of nut 12. The "$y$" lead-screw is also maintained perpendicular to the "$x$" lead-screw by nut 12.

The total circle of reflection sensor comprises cam 16, microswitch 17 and cam pin 18. The curved edge of cam 16 superposes a segment of a circle with its center on the axis of shaft 2, and radius equal to the radius of the instrumental total circle of reflection. The cam 16 is pivotable at 19 in such manner as to cause microswitch 17 to be inactive when the cam is lifted, i.e., pivoted about 19.

Affixed to point drive nut 8 and oriented colinear with the $x$ direction is the cam activating pin 18, the linear dimension of which is $2p$. The action of the cam actuator is as follows: Whenever the center of nut 8 moving in the "$x$"-direction approaches to within less than the distance $p$ from cam 16, the analogue of the total circle of reflection, cam 16 is lifted, i.e., pivoted about 19, inactivating microswitch 17.

FIG. 4 shows the point drive nut in three positions as it travels along the "$x$" lead-screw. In the position furthest to the left, the point drive nut is remote from the cam. Consequently, the instrument is in condition NF. In the next position to the right, the point drive nut is just contacting the cam, but the cam has not been moved. The instrument is still in the condition NF. In the furthest position to the right, the cam pin (shown in dotted lines) has now lifted the cam (pivoted the cam about 19 as shown in dotted lines) inactivating microswitch 17. The condition of the instrument is now F, and the program as shown in FIG. 3 is executed.

Different lengths of activating pins 18 may be used, depending upon the size of the reciprocal lattice repeat $x$. The cam actuator pin size is chosen such that $p > \Delta x$.

Various cams with different radii of curvature may be used conditioned by the choice of the maximum $\Upsilon$ angle such that $\Upsilon_{max} = 2 \arcsin R/2$.

Figure 3:
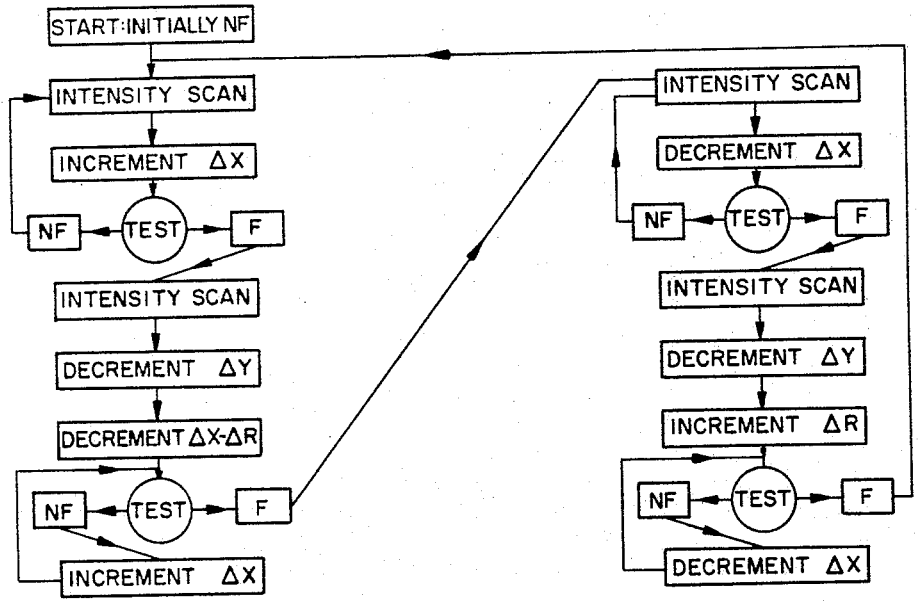
FIG. 3 is an operational flow chart.

It also will be appreciated by those skilled in this art that the sequence of operations illustrated schematically in FIG. 3 can be carried out by other forms of apparatus. Such apparatus may be an electromechanical analogue such as illustrated, or an electrical analogue responsive to a predetermined electrical condition, for instance, the number of counts registered from the photo-pulse generator.

Therefore, while we have described the invention with reference to a particular embodiment thereof, we do not wish to be limited thereto as other modifications will be apparent to those skilled in the art without departing from the spirit and scope and the invention as defined in the appended claims.

What we claim is:

1. In a diffractometer for the acquisition of crystallographic data from a single crystal including means to rotatably mount the crystal in the path of a beam of monochromatic X-rays, a movable detector, and means to constrain the movement of the detector and the crystal so that the detector is sequentially positioned at lattice points along a line of the reciprocal lattice of the crystal, said latter means including a pair of orthogonal guides corresponding to a set of axes in the reciprocal lattice of the crystal, means coupling said crystal and said detector to said guides, said coupling means comprising a member movable along one of said guides for sequentially positioning the detector at lattice points along a reciprocal lattice line of the crystal, said latter member being provided with an extension having a length less than the distance between successive lattice points on a reciprocal lattice line, and an early warning total-circle-of-reflection sensor comprising a cam having a curvature corresponding to a segment of the circle of reflection from the crystal which is engaged and moved by said extension on said member movable along said guide for recognizing the last obtainable reciprocal lattice point lying on a line colinear with said guide, and means responsive to movement of the cam for stopping movement of said detector and moving said guide along said other guide to an adjacent reciprocal lattice line.

2. A diffractometer as claimed in claim 1 in which each of the guides is a lead-screw one of which corresponds to an $x$-axis and the other a $y$-axis, the detector being coupled to a member movable along the $x$-axis, means being provided to rotate the lead-screw corresponding to the $x$-axis to move the detector sequentially to lattice positions along a line in the reciprocal lattice parallel to said lead-screw, said latter means including means to count the number of revolutions of the lead-screw and stop the lead-screw at successive lattice points along a given lattice line.

References Cited

UNITED STATES PATENTS 3,105,901  10/1963  Ladell et al. _____ 250—51.5

RALPH G. NILSON, *Primary Examiner.*

W. F. LINDQUIST, *Assistant Examiner.*